United States Patent
Chastain et al.

(10) Patent No.: US 6,847,989 B1
(45) Date of Patent: *Jan. 25, 2005

(54) METHOD AND SYSTEM FOR CREATING MAIL RULES FROM EXISTING MAIL

(75) Inventors: Alicia Anne Chastain, Raleigh, NC (US); Christopher Joseph Paul, Durham, NC (US); David Mark Wendt, Apex, NC (US)

(73) Assignee: International Business Machines Corporation, Armonk, NY (US)

(*) Notice: Subject to any disclaimer, the term of this patent is extended or adjusted under 35 U.S.C. 154(b) by 427 days.

This patent is subject to a terminal disclaimer.

(21) Appl. No.: 09/649,946

(22) Filed: Aug. 29, 2000

(51) Int. Cl.[7] .............................................. G06F 15/16
(52) U.S. Cl. ....................................... 709/207; 707/102
(58) Field of Search ................................ 709/206, 207, 709/102, 103 R

(56) References Cited

U.S. PATENT DOCUMENTS

| | | | | |
|---|---|---|---|---|
| 5,283,856 A | * | 2/1994 | Gross et al. ................... | 395/51 |
| 5,377,354 A | | 12/1994 | Scannell et al. ............ | 395/650 |
| 5,758,354 A | | 5/1998 | Huang et al. ............... | 707/201 |
| 5,794,001 A | | 8/1998 | Malone et al. ............... | 395/342 |
| 5,862,325 A | | 1/1999 | Reed et al. ............ | 395/200.31 |
| 5,899,995 A | * | 5/1999 | Millier et al. ................ | 707/102 |
| 5,917,489 A | | 6/1999 | Thurlow et al. ............ | 345/347 |
| 5,948,058 A | | 9/1999 | Kudoh et al. ............... | 709/206 |
| 5,978,566 A | * | 11/1999 | Plank et al. ............ | 395/200.36 |
| 5,978,836 A | * | 11/1999 | Ouchi ......................... | 709/206 |
| 6,021,427 A | | 2/2000 | Spagna et al. .............. | 709/206 |
| 6,023,700 A | | 2/2000 | Owens et al. ................. | 707/10 |
| 6,044,205 A | | 3/2000 | Reed et al. ............ | 395/200.31 |
| 6,216,122 B1 | * | 4/2001 | Elson ............................ | 707/3 |
| 6,411,947 B1 | * | 6/2002 | Rice et al. .................... | 706/47 |
| 6,424,995 B1 | * | 7/2002 | Shuman ...................... | 709/206 |
| 6,598,034 B1 | * | 7/2003 | Kloth .......................... | 706/47 |
| 6,654,787 B1 | * | 11/2003 | Aronson et al. ............ | 709/206 |

OTHER PUBLICATIONS

*Configuring E–Mail to be Forwarded into Folders*, http://www.tpk.net/tpk/configuring_forwarding.html,, Apr. 25, 2000, pp. 1–2.

*Smartmail Knowledge–Based System for the Officevision Desktop*, IBM Technical Disclosure Bulletin, Nov. 1990, p. 414.

*Rule–Based Dynamic Personal Variables*, IBM Technical Disclosure Bulletin, Nov. 1994, pp. 539–540.

* cited by examiner

*Primary Examiner*—Zarni Maung
*Assistant Examiner*—Kimberly Flynn
(74) *Attorney, Agent, or Firm*—Synnestvedt & Lechner LLP; Bruce Clay

(57) ABSTRACT

A method in a data processing system for creating rules to process electronic messages. User input is detected moving an electronic message into a folder. In response to this user input, the characteristics of the electronic message are compared with other electronic messages in the folder to form a comparison. A rule for processing the electronic message is generated based on the comparison.

39 Claims, 9 Drawing Sheets

METHOD AND SYSTEM FOR CREATING MAIL RULES FROM EXISTING MAIL

CROSS REFERENCE TO RELATED APPLICATION

The present invention is related to an application entitled METHOD AND SYSTEM FOR MODIFYING MAIL RULES, Ser. No. 09/650,849, all of which are filed even date hereof, assigned to the same assignee, and incorporated herein by reference.

FIELD OF THE INVENTION

The present invention relates generally to an improved data processing system and in particular to a method and apparatus for processing electronic messages. Still more particularly, the present invention provides a method and apparatus for creating rules for processing electronic messages.

BACKGROUND OF THE INVENTION

The Internet, also referred to as an "internetwork", is a set of computer networks, possibly dissimilar, joined together by means of gateways that handle data transfer and the conversion of messages from the sending network to the protocols used by the receiving network (with packets if necessary). When capitalized, the term "Internet" refers to the collection of networks and gateways that use the TCP/IP suite of protocols.

The Internet has become a cultural fixture as a source of information, entertainment, and communications. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies which must interact with virtually all segments of society such as the Internal Revenue Service and secretaries of state. Providing informational guides and/or searchable databases of online public records may reduce operating costs. Further, the Internet is becoming increasingly popular as a medium for commercial transactions.

In addition to being a source of information, the Internet also provides a communications medium. The Internet has become the most popular computer network used by consumers and businesses to send and receive electronic mail, also referred to as "e-mail". The Internet allows users to readily send and receive e-mail to and from computers around the world. Each user typically has a unique Internet e-mail address (e.g., steve@ibm.com). A user with an e-mail account and a computer capable of connecting to the Internet can easily send and receive e-mail over the network.

E-mail allows a person to quickly and easily send textual messages and other information, such as, for example, pictures, sound recordings, and formatted documents electronically to other e-mail users anywhere in the world. An e-mail user will typically create a message using an e-mail program running on a computer connected to a computer network through a modem. The message will include an e-mail "address" for the intended recipient. When the user has finished entering the message, the user may "send" the message to the intended recipient. The e-mail program then electronically transmits the message over the computer network. The recipient, using an e-mail program running on the recipient's computer, can then "receive" the message.

When receiving messages, the messages are typically placed in an "inbox" from which the recipient can view the messages. Additionally, some e-mail programs allow a user to set up rules for intercepting messages intended for them and acting upon the message via a "mail" rule. For example, a user may set up a rule to direct any mail received from a particular sender to be automatically placed into a particular folder. Many e-mail programs allow the users to define rules to perform actions on incoming messages. For example, the rule may perform a selected action based on the content of a mail header or the specific content of the message. In another example, the user may direct any mail received containing a selected phrase in the body of a message to be automatically deleted. Currently available e-mail programs provide a user interface for the user to compose rules for use in filtering and processing messages. These interfaces are sometimes confusing and complicated for users. Currently, the rules are typically created manually through a dialog or series of dialogs in which a user defines the rule, what conditions must be present for the rule to take effect, and the resulting action. As a result, some users do not use rules to filter and process messages.

Therefore, it would be advantageous to have an improved method and apparatus for creating rules used in processing incoming messages.

SUMMARY OF THE INVENTION

The present invention provides a method in a data processing system for creating rules to process electronic messages. The mechanism of the present invention is used in the instances in which a rule is absent. User input is detected moving an electronic message into a folder. In response to this user input, the characteristics of the electronic message is used to generate a new mail rule. If other messages exist in the folder and the user has selected these other messages, the characteristics of the new message are compared with other electronic messages in the folder to form a comparison. A rule for processing the electronic message is then generated based on the comparison.

The generated rule is presented for acceptance or modification by the user. If the user accepts the rule, the rule is saved. The user may modify the rule or cancel creation of the rule. In modifying an existing rule, the mechanism of the present invention may present new conditions for the rule if the rule presented to the user is unacceptable. With messages already present in the folder, commonality between the electronic message being moved into the folder and the other messages present in the folder (upon which the existing rule is based) is used to select conditions for generating the rule. Further, new rules may be generated for actions other than moving a message into a folder. For example, rules may be generated under the mechanism of the present invention for actions such as deleting or forwarding the electronic message.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
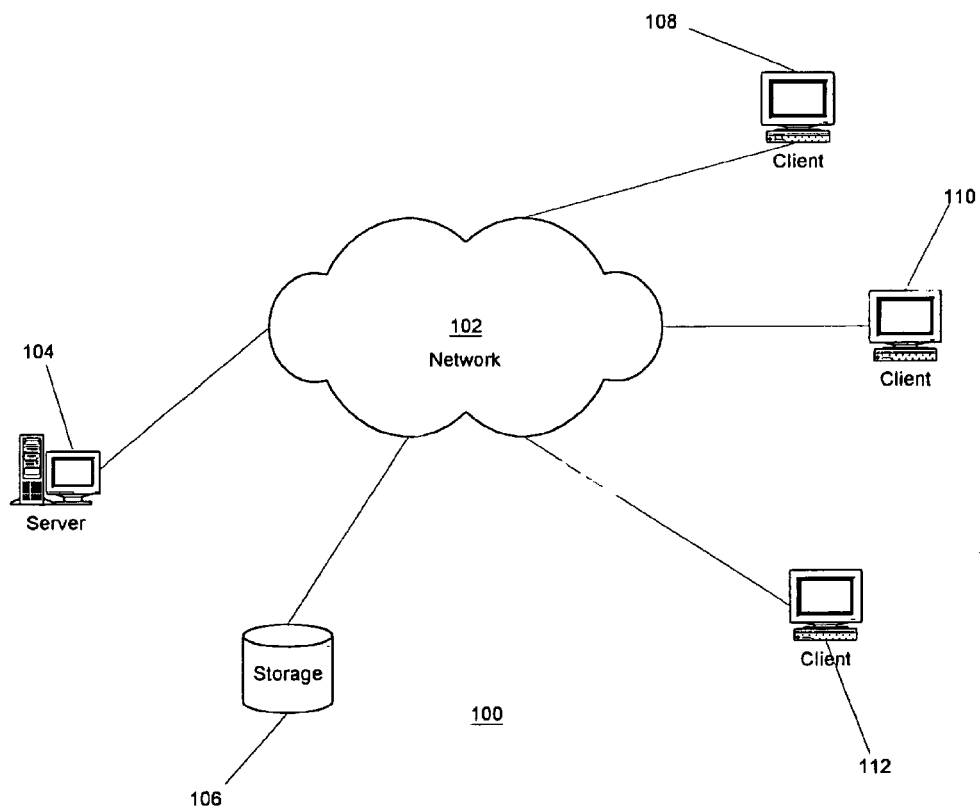
FIG. 1 depicts a pictorial representation of a distributed data processing system in which the present invention may be implemented.

With reference now to the figures, FIG. 1 depicts a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104. In the depicted examples, server 104 may contain an electronic mail system from which clients 108, 110, and 112 send and receive e-mail messages through e-mail programs or applications located on the clients. Distributed data processing system 100 may include additional servers, clients, and other devices not shown. For example, messages may be sent and received between server 104 and other servers (not shown) to distribute and receive messages from other clients (not shown).

In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, distributed data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
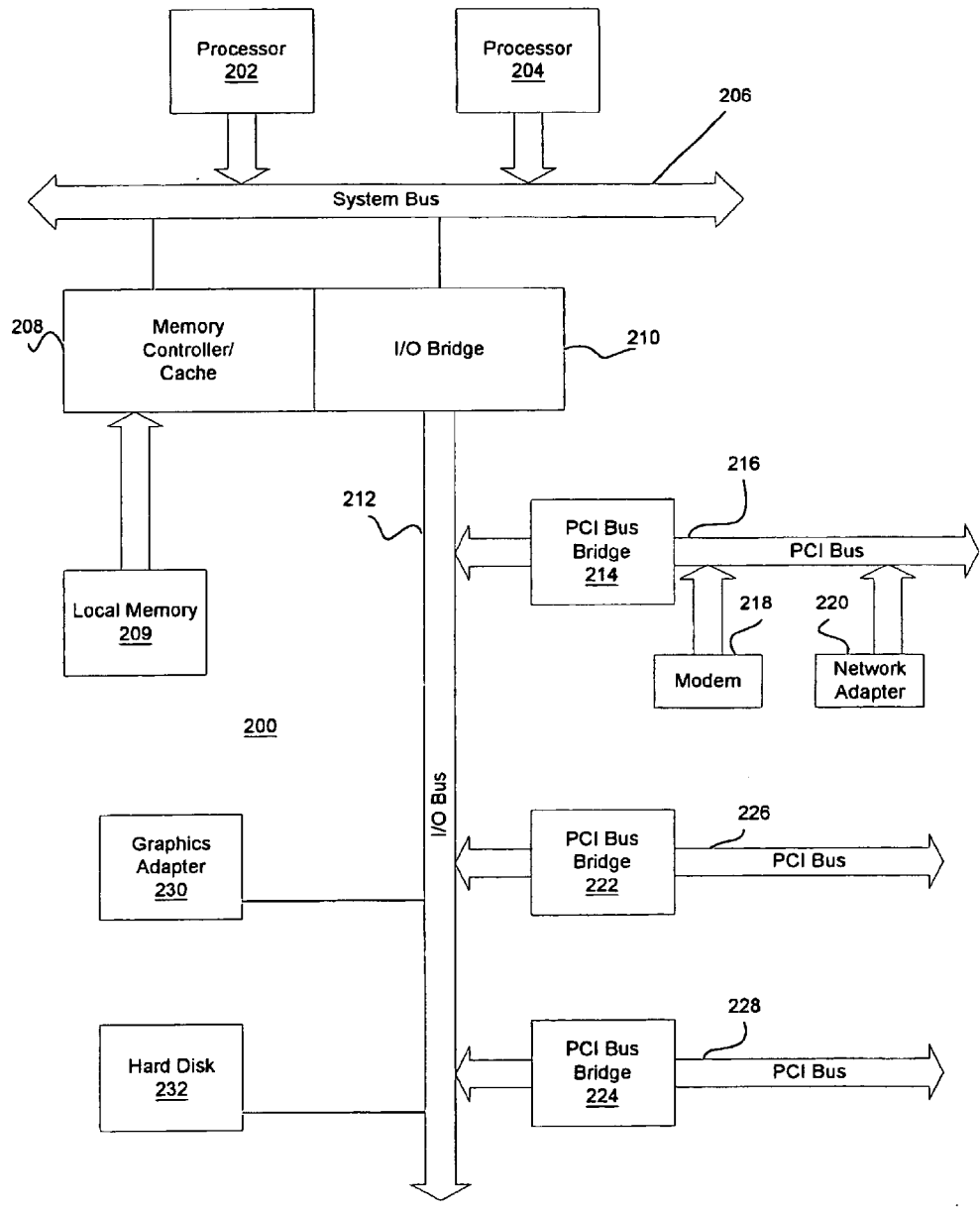
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. In the depicted examples, data processing system 200 is used as an electronic mail message server providing service to a number of different clients.

Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
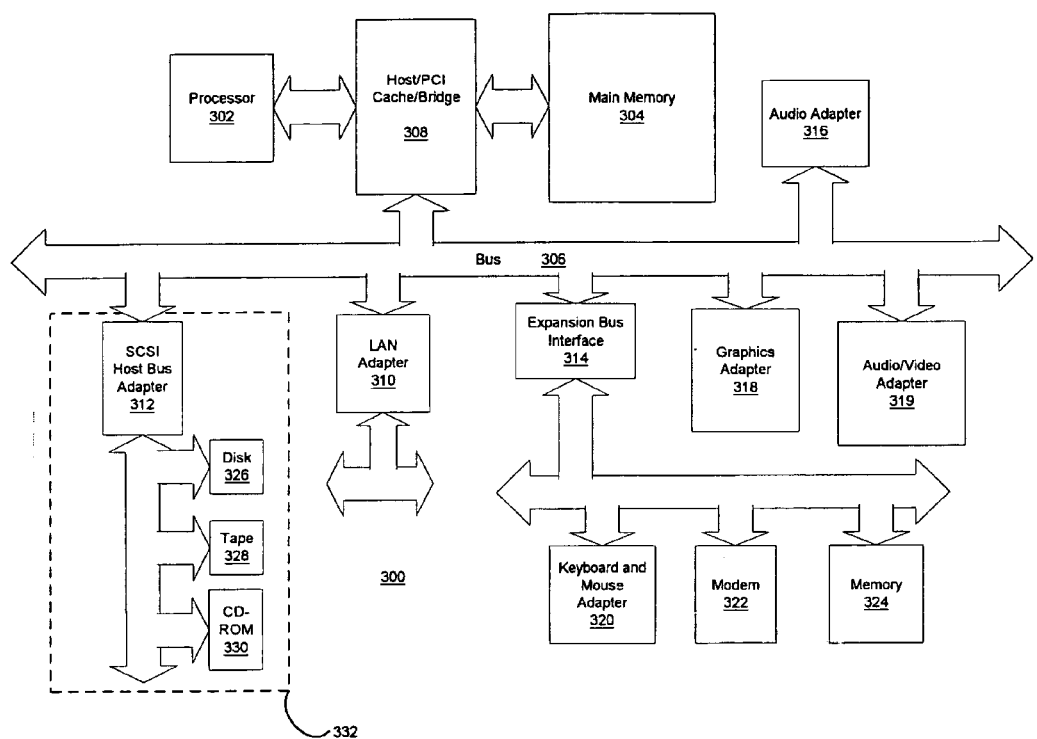
FIG. 3 is a block diagram illustrating a data processing system in which the present invention may be implemented.

With reference now to FIG. 3, a block diagram illustrating a data processing system in which the present invention may be implemented. Data processing system 300 is an example of a client computer. In these examples, data processing system 300 may include any mail program or application for generating, sending, and receiving all messages.

Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provides calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

For example, data processing system 300, if optionally configured as a network computer, may not include SCSI host bus adapter 312, hard disk drive 326, tape drive 328, and CD-ROM 330, as noted by dotted line 332 in FIG. 3 denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides a method, apparatus, and computer implemented instructions for creating rules for processing electronic messages. The mechanism of the present invention creates a new rule based on user input manipulating electronic messages. For example, to create a new rule that would move specific electronic messages into a specific folder, the user moves an existing electronic message with the desired characteristics in the folder. Then, the user selects or multiselects the electronic message or messages placed into the folder and initiates an action to make a rule. This initiation may be accomplished in a number of ways, such as, for example, a menu choice, a toolbar button, or a pointer menu. The mechanism of the present invention parses through the selected message or messages and looks for commonality or specific characteristics. When complete, the user is presented with the result of the comparison. If the comparison yields a condition of commonality, a rule based on these results is generated and presented to the user. The user may then name and accept the new rule. If no clear condition of commonality is present, a series of options based on selected criteria is presented to the user.

For example, the user creates a folder entitled "From Joe" and the user drags existing electronic messages from Joe into this folder. Then, the messages are selected and the user initiates the mechanism of the present invention to make a rule. The messages are parsed and, in this example, the commonality between the messages is the address of the sender, joe@ibm.com. The user is presented with a dialog asking to confirm a new rule to move all messages from the sender, joe@ibm.com, into the folder "From Joe". If the user confirms the rule, the rule is then saved. Otherwise, the user may make modifications to the rule if desired or discard the rule.

Figure 4:
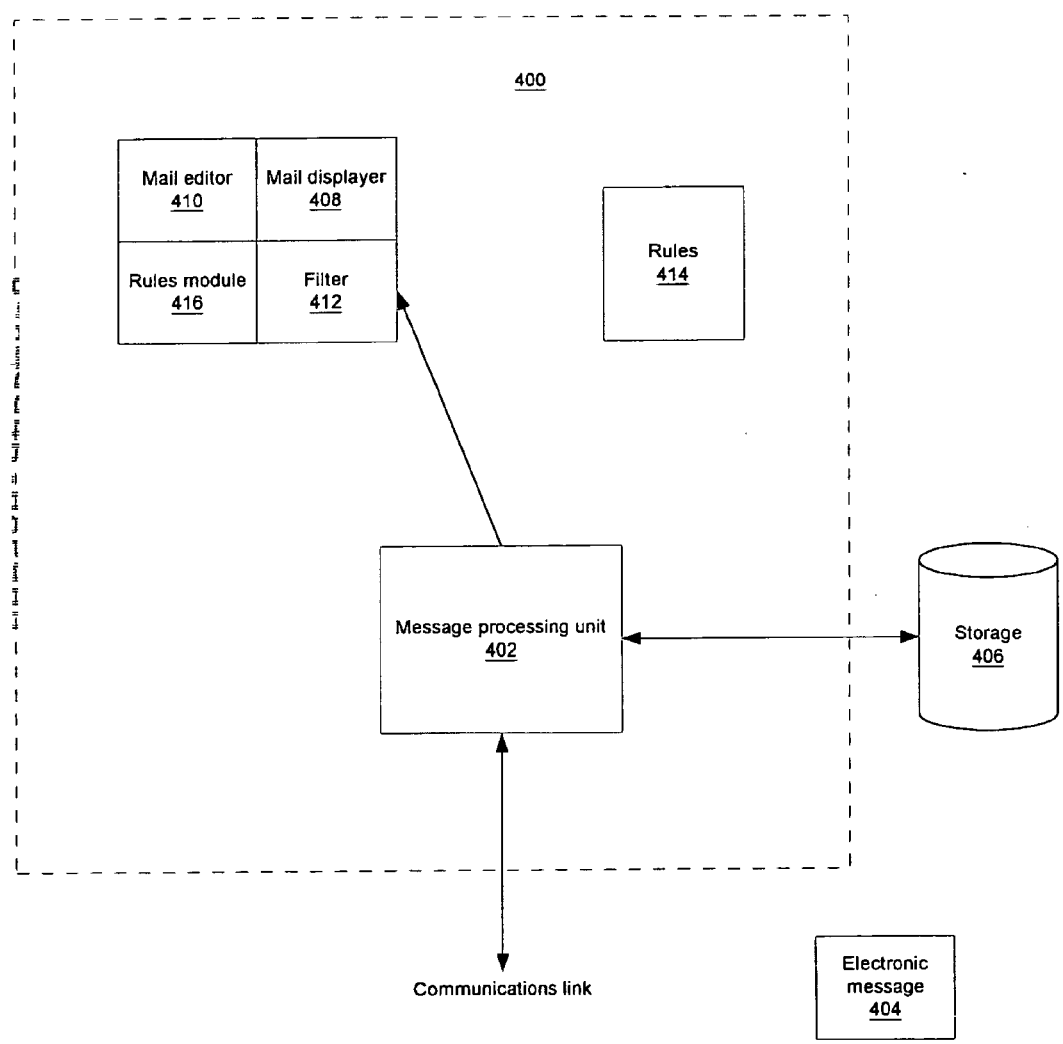
FIG. 4 is a block diagram of an e-mail program in accordance with a preferred embodiment of the present invention.

Turning next to FIG. 4, a block diagram of an e-mail program is depicted in accordance with a preferred embodiment of the present invention. E-mail program 400 in this example includes a message processing unit 402 which processes messages, such as electronic message 404, created and received by the user. Message processing unit 402 may be implemented by using currently available mail systems, such as Lotus Notes or CC Mail, which are available from Lotus Development Corporation. If electronic message 404 is an electronic message received by message processing unit 402, the electronic message may be stored in storage 406.

Mail program 400 also includes mail displayer 408, which is a graphical user interface (GUI) that is used to display electronic message 404. If the user edits or generates an electronic message, these functions may be accomplished through mail editor 410. Electronic messages may be placed into different folders in storage 406 by message processing unit 402 using filter 412. Filter 412 identifies actions to perform upon electronic messages based on the content in the messages and rules 414. Rules 414 include rules such as those for routing messages to various folders as well as taking other actions, such as forwarding or deleting electronic messages. Further, mail program 400 includes a rules module 416, which is an example of where the processes of the present invention may be implemented. In particular, rules module 416 will identify user actions upon an electronic message, compare the electronic message against criteria to generate a rule. The rule is then presented to the user for acceptance or modification. The criteria may be preselected criteria if the action on the electronic message is a movement of the electronic message into a folder. Further, the user may select other messages, if present in the folder, such that these messages are used in generating the new rule. In such a case, the mechanism of the present invention searches for a commonality within all of the selected messages and the message that is moved into the folder.

Alternatively, the criteria may be based on content in selected portions of the electronic message or whether selected content is present in the electronic message. For example, the criteria may be to select the sender's address for use in generating a rule with the subject matter of the message being the second option for use in generating the rule. Also, if certain words are present between multiple messages, these words may be used in generating the rule.

The time and date in the electronic message is an example of another criteria. Any information in the electronic message may be used. Some criteria may be given priority over other criteria, using a priority rule depending on the implementation. The commonality may be priority-based in which commonality in the sender's address is searched for before commonality of the subject of the message.

Figure 5A:
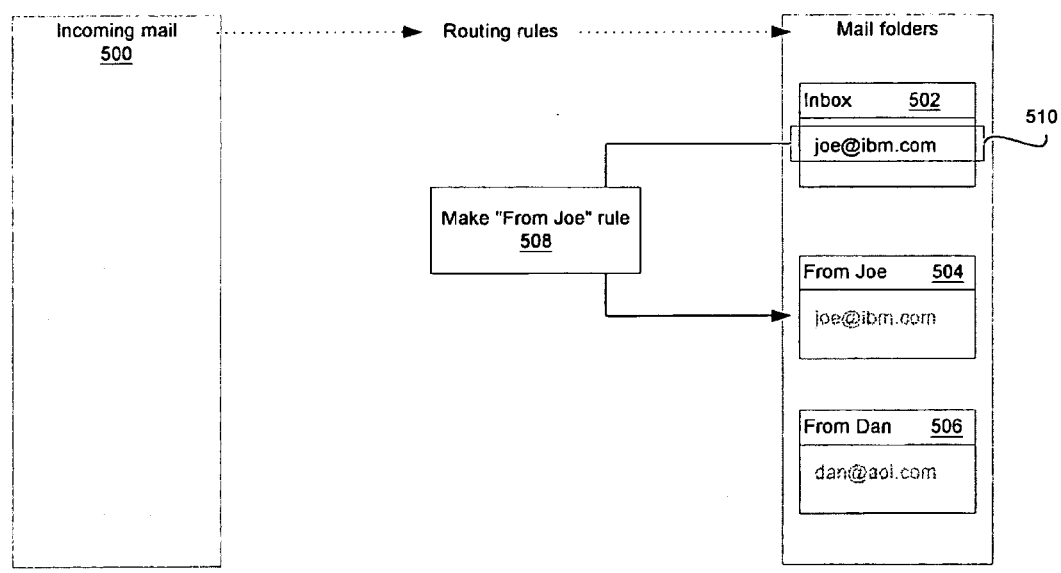
FIGS. 5A–5C are diagrams illustrating a process for making and using a rule in accordance with a preferred embodiment of the present invention.
Figure 5B:
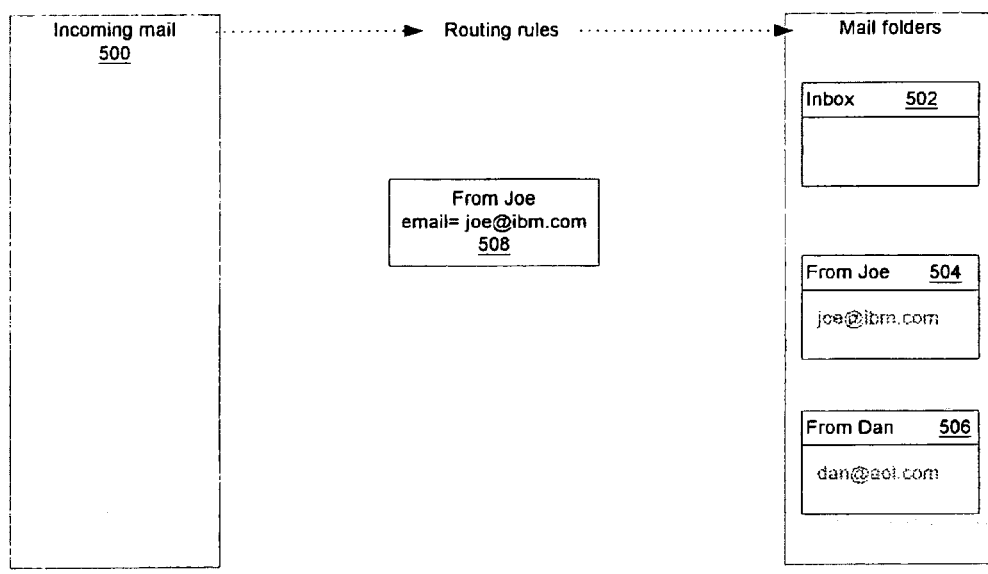
Figure 5C:
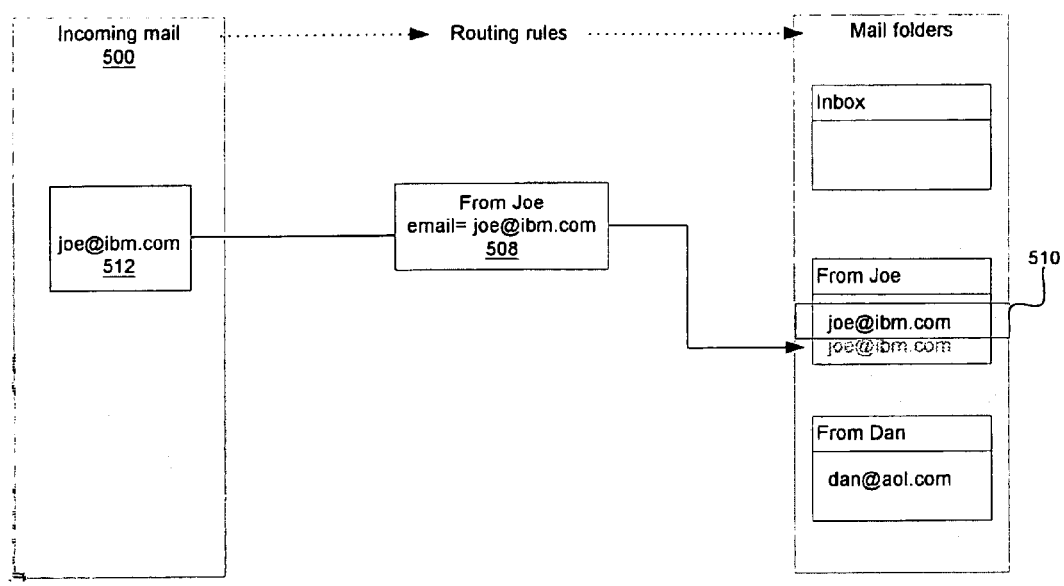

Turning next to FIGS. 5A–5C, diagrams illustrating a process for making and using a rule are depicted in accordance with a preferred embodiment of the present invention. Incoming mail 500 may be placed into mail folders entitled "Inbox" 502, "Frog Joe" 504, and "From Dan" 506 using various routing rules, such as rule 508. In this example, the user initiates generation of rule 508 by creating the folder "From Joe" 504. The user then selects electronic message 510 in folder "Inbox" 502 and places that electronic message in folder "From Joe" 504. The mechanism of the present invention analyzes the electronic message and proposes or displays a rule to the user that will take incoming mail with the header "From" that equals "joe@ibm.com" and places that electronic message in folder "From Joe" 504.

In FIG. 5B, rule 508 has been accepted by the user and is stored as a routing rule. This rule may be stored in rules 414 in FIG. 4. This routing rule takes all messages having a header "From" that equals "joeibm.com" and places the electronic message in folder 504 entitled "From Joe". In FIG. 5C, an incoming message 512 is received. In this example, the content in the header "From" is "joe@ibm.com". Using rule 508, electronic message 512 is placed into folder "From Joe" 504.

In this manner, the user is not required to navigate numerous dialog boxes to generate a rule. The rule is generated based on the existing mail and the user's input. The user then is able to accept the rule, modify it, or cancel it.

Figure 6:
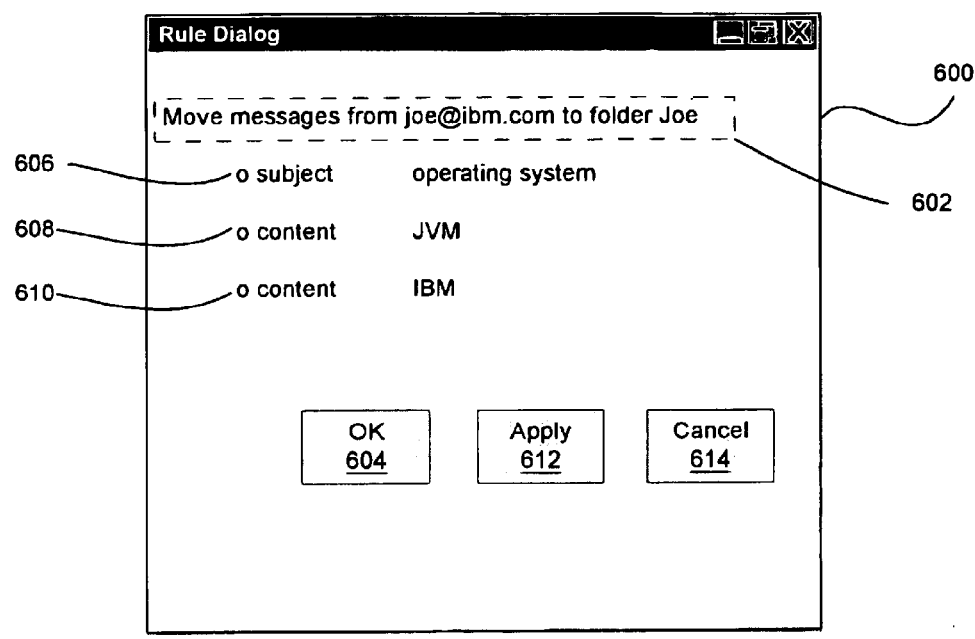
FIG. 6 is a diagram illustrating an example interface used to present a rule to a user in accordance with a preferred embodiment of the present invention.

Turning next to FIG. 6, a diagram illustrating an example interface used to present a rule to a user is depicted in accordance with a preferred embodiment of the present invention. Rule dialog 600 is an example of a dialog used to present a rule to a user based on the sequence of actions taken by a user in FIGS. 5A–5B. Dialog 600 presents a rule in section 602 to the user based on the user's actions in moving electronic mail message 510 from the folder "Inbox" 502 to the folder "From Joe" 504. The user may accept this proposed rule by selecting "OK" button 604, which causes the rule to be saved. Alternatively, the user may modify the rule by selecting alternatives such as the subject or content as presented by selections 606–610 in dialog 600. After selecting one or more of these selections, a new rule may be generated by selecting "Apply" button (or similar device) 612. A new rule will then be presented to the user for viewing. If the user decides not to use the rule, the rule may be discarded by selecting "Cancel" button 614.

Figure 7:
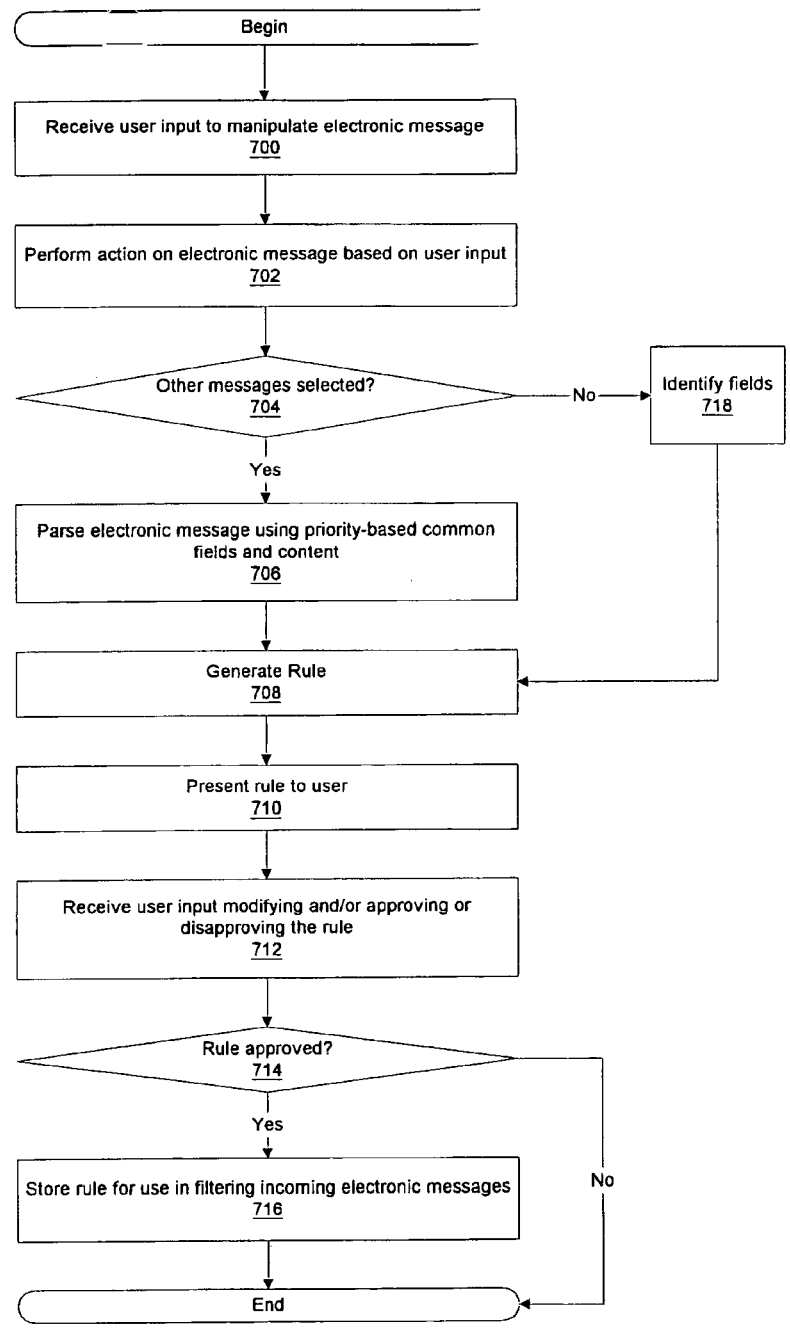
FIG. 7 is a flowchart of a process used for generating a rule based on user manipulation of an electronic message in accordance with a preferred embodiment of the present invention.

Turning next to FIG. 7, a flowchart of a process used for generating a rule based on user manipulation of an electronic message is depicted in accordance with a preferred embodiment of the present invention. The process illustrated in FIG. 7 may be implemented in rules module 416 in FIG. 4. In this example, the process is initiated by the user selecting a menu or graphical control indicating that a new rule should be generated.

The process begins by receiving user input to manipulate the electronic message (step 700). In the depicted examples, the manipulation may take various forms, such as, for example, moving the electronic message from one folder to another folder, deleting the electronic message, or forwarding the electronic message. Next, an action on the electronic message is performed based on the user input (step 702). A determination is then made as to whether the user has selected other electronic messages (step 704). If the user has selected other messages in addition to the electronic message on which the action has been taken, the electronic message is parsed using priority-based common fields and content (step 706). In other words, commonality between the electronic message and other electronic messages may be identified or content from selected fields may be identified. Then, a rule is generated (step 708). The rule is presented to the user (step 710). Next, user input is received modifying and/or approving or disapproving the rule (step 712).

Next, a determination is made as to whether the rule was approved (step 714). If the rule was approved, the rule is stored for use in filtering incoming mail (step 716) with the process terminating thereafter. With reference again to step 714, if the rule was not approved, the process terminates.

Turning back to step 704, if other messages are not selected, then selected fields are identified (step 718) with the process then proceeding to step 708 to generate a rule based on these identified fields.

Thus, the present invention provides a method, apparatus, and computer implemented instructions for creating mail rules using existing electronic messages. The manipulation of the electronic message is used to identify the action to be taken. Future messages on which the action is to be taken is identified based on comparing the electronic message to a criteria. The results of the comparison of the message to a criteria may contain common content between the selected message and other messages. Additionally, characteristics such as the address and the subject are examples of other characteristics that may be identified. Multiple characteristics also may be used. For example, the address of the sender and the date of the message may be used to route or place messages into a particular folder. Of course, other actions such as deleting messages and forwarding messages, may be implemented in the rules based on user actions manipulating an electronic message.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, RAM, CD-ROMs, and transmission-type media such as digital and analog communications links.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for automatically creating rules to process electronic messages, the method comprising the data processing system implemented steps;

detecting user input moving an electronic message into a folder;

comparing characteristics of the electronic message with other electronic messages in the folder to form a comparison; and automatically generating a rule to process electronic messages based on the comparison.

2. The method of claim 1 further comprising:

processing received messages using the rule.

3. The method of claim 2, wherein the processing step is initiated in response to another user input approving use of the rule.

4. The method of claim 1, wherein the criteria includes priority-based common fields and common content.

5. The method of claim 1, wherein the folder is a trash folder.

6. The method of claim 1, wherein the detecting step, the comparing step, and the generating step are initiated in response to a selected user input.

7. The method of claim 1, wherein the criteria includes at least one of a sender address, a selected word in a subject line body of the electronic message, a select word in a body of the electronic message, and an attribute of the time/date field of the electronic message.

8. The method of claim 1, wherein the other electronic messages in the folder are electronic messages selected through user input.

9. The method of claim 1 further comprising:

generating the rule to process electronic messages based on characteristics of the electronic message if other electronic messages in the folder are absent.

10. The method of claim 1 further comprising:

generating the rule to process electronic messages based on characteristics of the electronic message if other electronic messages in the folder are unselected by user input.

11. The method of claim 10 further comprising:

presenting the rule for review; and using the rule to process electronic messages if user input accepting the rule is received.

12. The method of claim 11 further comprising:

presenting a modification of the rule if user input accepting the rule is absent.

13. A method in a data processing system for processing electronic messages, the method comprising the data processing system implemented steps of:

identifying an action on an electronic message;

identifying characteristics of the electronic message using a criteria to form a comparison; and automatically generating a rule to process electronic messages including the action and a selected characteristic identified in the comparison.

14. The method of claim 13, wherein the action is a deletion of the electronic message.

15. The method of claim 13 further comprising:

responsive to the action being performed on other electronic messages comparing characteristics of the electronic message the other electronic messages.

16. The method of claim 13, wherein the action is a movement of the electronic message into a folder containing other electronic messages and wherein the step of identifying characteristics comprises:

comparing the electronic message to other electronic messages using the criteria to form the comparison.

17. A data processing system comprising:

a bus system;

a communications unit connected to the bus system;

a memory connected to the bus system, wherein the memory includes as set of instructions; and a processing unit connected to the bus system, wherein the processing unit executes the set of instructions to identify an action on an electronic message, identify characteristics of the electronic message using a criteria to form a comparison, and automatically generate a rule to process electronic messages including the action and a selected characteristic identified in the comparison.

18. The data processing system of claim 17, wherein the bus system is a single bus.

19. The data processing system of claim 17, wherein the bus system includes a primary bus and a secondary bus.

20. The data processing system of claim 17, wherein the processing unit includes a plurality of processors.

21. The data processing system of claim 17, wherein the communications unit is one of a modem and Ethernet adapter.

22. A data processing system in a data processing system for automatically creating rules to process electronic messages, the data processing comprising:

detecting means for detecting user input moving an electronic message into a folder;

comparing means for comparing characteristics of the electronic message with other electronic messages in the folder to form a comparison; and generating means for automatically generating a rule to process electronic messages based on the comparison.

23. The data processing system of claim 22 further comprising:

processing means for processing received messages using the rule.

24. The data processing system of claim 22, wherein the generating means is activated in response to another user input approving use of the rule.

25. The data processing system of claim 21, wherein the criteria includes priority-based common fields and common content.

26. The data processing system of claim 21, wherein the folder is a trash folder.

27. The data processing system of claim 21, wherein the detecting means, the comparing means, and the generating means are activated in response to a selected user input.

28. The data processing system of claim 21, wherein the criteria includes at least one of a sender address, a selected word in a subject line body of the electronic message, a select word in a body of the electronic message, and an attribute of the time/date field of the electronic message.

29. The data processing system of claim 21, wherein the other electronic messages in the folder are electronic messages selected through user input.

30. The data processing system of claim 21 further comprising:

generating means for automatically generating the rule to process electronic messages based on characteristics of the electronic message if other electronic messages in the folder are absent.

31. The data processing system of claim 21 further comprising:

generating means for automatically generating the rule to process electronic messages based on characteristics of the electronic message if other electronic messages in the folder are unselected by user input.

32. The data processing system of claim 31 further comprising:
presenting means for presenting the rule for review; and
using means for using the rule to process electronic messages if user input accepting the rule is received.

33. The data processing system of claim 32 further comprising:
presenting means for presenting a modification of the rule if user input accepting the rule is absent.

34. A data processing system for processing electronic messages, the data processing system comprising the data processing system implemented steps of:
first identifying means for identifying an action on an electronic message;
second identifying means for identifying characteristics of the electronic message using a criteria to form a comparison; and
generating means for automatically generating a rule to process electronic messages including the action and a selected characteristic identified in the comparison.

35. The data processing system of claim 34, wherein the action is a deletion of the electronic message.

36. The data processing system of claim 34 further comprising:
responsive means for responsive to the action being performed on other electronic messages comparing characteristics of the electronic message the other electronic messages.

37. The data processing system of claim 34, wherein the action is a movement of the electronic message into a folder containing other electronic messages and wherein the second identifying means comprises:
comparing means for comparing the electronic message to other electronic messages using the criteria to form the comparison.

38. A computer program product in a computer readable medium for use in a data processing system for automatically creating rules to process electronic messages, the computer program product comprising the data processing system implemented steps of:
first instructions for detecting user input moving an electronic message into a folder;
second instructions for comparing characteristics of the electronic message with other electronic messages in the folder to form a comparison; and
third instructions for automatically generating a rule to process electronic messages based on the comparison.

39. A computer program product in a data processing system for processing electronic messages, the computer program product comprising the data processing system implemented steps of:
first instructions for identifying an action on an electronic message;
second instructions for identifying characteristics of the electronic message using a criteria to form a comparison; and
third instructions for automatically generating a rule to process electronic messages including the action and a selected characteristic identified in the comparison.

* * * * *